(12) United States Patent  (10) Patent No.: US 9,036,100 B2
Yang et al.  (45) Date of Patent: May 19, 2015

(54) LIQUID CRYSTAL LENS AND 3D DISPLAY USING THE SAME

(71) Applicant: AU Optronics Corp., Hsin-Chu (TW)

(72) Inventors: Po-Sen Yang, Hsin-Chu (TW); Yung-Sheng Tsai, Hsin-Chu (TW); Jen-Lang Tung, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 73 days.

(21) Appl. No.: 14/091,676

(22) Filed: Nov. 27, 2013

(65) Prior Publication Data

US 2015/0009434 A1  Jan. 8, 2015

(30) Foreign Application Priority Data

Jul. 8, 2013 (TW) .............................. 102124426 A

(51) Int. Cl.
*G02F 1/1335* (2006.01)
*G02F 1/1337* (2006.01)
*G02F 1/1343* (2006.01)
*G02B 27/22* (2006.01)

(52) U.S. Cl.
CPC ...... *G02B 27/2214* (2013.01); *G02F 1/133784* (2013.01); *G02F 1/134309* (2013.01)

(58) Field of Classification Search
CPC .................... G02F 1/133526; G02F 1/133621; G02F 1/133512; G02F 1/136286; G02F 1/133707; G02F 1/134336; G02F 1/133784; G02F 1/1337; G02F 1/134363
USPC ...................................... 349/15, 95, 139, 126
See application file for complete search history.

(56) References Cited

U.S. PATENT DOCUMENTS

2014/0118644 A1* 5/2014 Liu et al. .......................... 349/15
2014/0204292 A1  7/2014 Liao et al.

FOREIGN PATENT DOCUMENTS

| TW | 201011350 | 3/2010 |
| TW | M388658 | 9/2010 |
| TW | 201042284 | 12/2010 |
| TW | 201232133 | 8/2012 |
| TW | 201341915 A | 10/2013 |
| TW | 201416715 A | 5/2014 |
| TW | 201430386 A | 8/2014 |

OTHER PUBLICATIONS

Taiwan Patent Office, "Office Action", Oct. 27, 2014.

* cited by examiner

*Primary Examiner* — Mike Qi
(74) *Attorney, Agent, or Firm* — WPAT, PC; Justin King

(57) ABSTRACT

A liquid crystal (LC) lens includes a first substrate, a second substrate, and a plurality of liquid crystal units disposed between the first substrate and the second substrate. Each liquid crystal unit includes a first sub-unit having a first electrode and a second electrode disposed on the first substrate with a first interval therebetween and a third electrode and a fourth electrode disposed on the second substrate with a second interval therebetween. A first voltage difference is applied between the first electrode and the third electrode, and a second voltage difference is applied between the second electrode and the fourth electrode. The polarity of the first voltage difference is contrary to that of the second voltage difference, and the first interval is not equal to the second interval. A 3D display including the LC lens and a display panel is also provided.

18 Claims, 11 Drawing Sheets

LIQUID CRYSTAL LENS AND 3D DISPLAY USING THE SAME

FIELD OF THE INVENTION

The invention relates to a liquid crystal (LC) lens, and more particularly to an LC lens used in a 3D display.

BACKGROUND 3D stereoscopic displays show 3D stereoscopic images based on the principle of binocular parallax. That is, different images are respectively provided to viewer's left and right eyes such that 3D stereoscopic images can be synthesized from the left- and right-eye images. Commercial 3D stereoscopic displays can be largely classified into two types: a glasses type 3D stereoscopic display and a naked eye 3D stereoscopic display. The naked eye 3D stereoscopic display shows 3D stereoscopic images to the viewer without the need to wear any accessories. The naked eye 3D stereoscopic display can be largely classified into two types: a space-division multiplexing type and a time-division multiplexing type.

The naked eye 3D stereoscopic display of the space-division multiplexing type generates 3D stereoscopic images by separating the display image into left-eye image pixels and right-eye image pixels, and projecting the left-eye image pixels and the right-eye image pixels to the left eye and the right eye at the same time, respectively, by a split device. Then, the viewer can view a 3D stereoscopic image due to the effect of binocular parallax.

A liquid crystal (LC) lens can achieve the effect of the split device, by refracting left-eye image pixels to the left eye of the viewer, and at the same time refracting right-eye image pixels to the right eye of the viewer. In the operation of an LC lens, an electric field generated by at least one applied voltage is used to drive LC molecules to rotate in desired directions. In this way, regions with different refractive indexes are formed in the LC layer, thereby the focusing effects of a normal solid lens can be achieved so as to perform splitting. When the LC lens is not in operation, the 3D stereoscopic display can be switched to a 2D display. This allows the viewer to select to view 2D images or 3D stereoscopic images on the same display, and the effect of 2D/3D switching can be achieved.

Referring to FIG. 1, which is a schematic diagram showing a refractive index distribution curve of a conventional LC lens, when a high refractive effect is required, a gap d between a first substrate 11 and a second substrate 12 at two opposite sides of the LC unit must be largely increased as shown by the refractive index curve 10. This will increase the cost of the liquid crystal and the overall thickness of a completed display. Also, a too large gap will decrease the response speed of the liquid crystal. Therefore, a major object of the invention is to ameliorate the above-mentioned deficiencies.

SUMMARY OF THE INVENTION

An object of the invention is to provide a liquid crystal lens, including a first substrate, a second substrate and a plurality of liquid crystal unit disposed between the first substrate and the second substrate, wherein each liquid crystal unit includes a first sub-unit, and the first sub-unit includes: a first electrode and a second electrode disposed on the first substrate with a first interval therebetween; and a third electrode and a fourth electrode disposed on the second substrate with a second interval therebetween, wherein a first voltage difference is applied between the first electrode and the third electrode, a second voltage difference is applied between the second electrode and the fourth electrode, and a polarity of the first voltage difference is contrary to that of the second voltage difference and the first interval is not equal to the second interval. Voltage difference is the voltage of the electrode located on the first substrate minus that of the corresponding electrode located on the second substrate.

Another object of the invention is to provide a 3D display including a display panel and a liquid crystal lens disposed above the display panel, the liquid crystal lens including a first substrate, a second substrate and a plurality of liquid crystal unit disposed between the first substrate and the second substrate, wherein each liquid crystal unit includes a first sub-unit, the first sub-unit includes: a first electrode and a second electrode disposed on the first substrate with a first interval therebetween; and a third electrode and a fourth electrode disposed on the second substrate with a second interval therebetween, wherein a first voltage difference is applied between the first electrode and the third electrode, a second voltage difference is applied between the second electrode and the fourth electrode, and a polarity of the first voltage difference is contrary to that of the second voltage difference and the first interval is not equal to the second interval.

In a preferred embodiment of the invention, in the above liquid crystal lens, the first substrate has a first alignment layer, the second substrate has a second alignment layer, and a rubbing direction to the first alignment layer is contrary to a rubbing direction to the second alignment layer.

In a preferred embodiment of the invention, in the above liquid crystal lens, each liquid crystal unit further includes a second sub-unit, the second sub-unit and the first sub-unit are symmetrically disposed in the liquid crystal unit with respect to a symmetric axis, the second sub-unit includes a fifth electrode and a sixth electrode disposed on the first substrate with a third interval therebetween; and a seventh electrode and an eighth electrode disposed on the second substrate with a fourth interval therebetween, wherein a third voltage difference is applied between the fifth electrode and the seventh electrode, a fourth voltage difference is applied between the sixth electrode and the eighth electrode, and a polarity of the third voltage difference is contrary to that of the fourth voltage difference and the third interval is not equal to the fourth interval.

In a preferred embodiment of the invention, in the above liquid crystal lens, each liquid crystal unit further includes a third sub-unit disposed between the first sub-unit and second sub-unit, the third sub-unit includes: a ninth electrode disposed on the second substrate and in connect with the third electrode, and the ninth electrode extending toward a symmetric axis direction; and a tenth electrode disposed on the first substrate and in connect with the fifth electrode, and the tenth electrode extending toward a symmetric axis direction.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
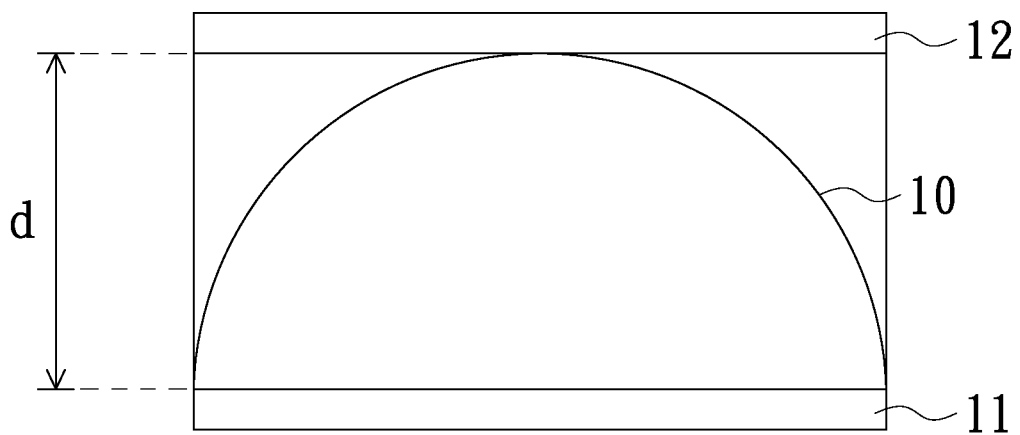
FIG. 1 is a schematic diagram showing a refractive index distribution curve of a conventional liquid crystal (LC) lens.
Figure 2:
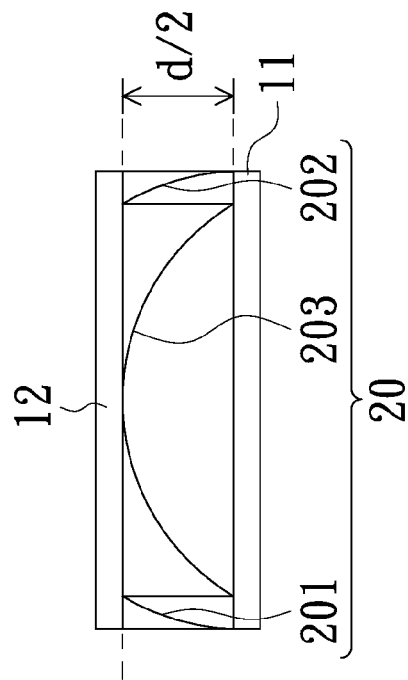
FIG. 2 is a schematic diagram showing a refractive index distribution curve when the conventional LC lens shown in FIG. 1 is replaced by a two-level LC Fresnel lens.
Figure 2:
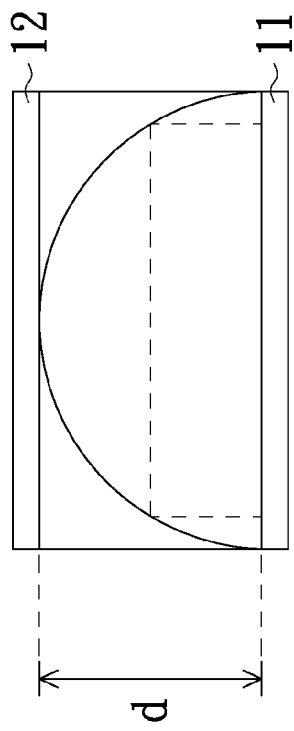

FIG. 2 is a schematic diagram showing a refractive index distribution curve when the conventional liquid crystal (LC) lens shown in FIG. 1 is replaced by a two-level LC Fresnel lens. Since the light is refracted in the LC lens in relation to the refractive index change but not to the absolute value of the refractive index, the same refraction effect can be obtained by maintaining the refractive index change curve. Although the thickness of the LC lens shown at the left side of FIG. 2 is almost double of that shown at the right side of FIG. 2, since the refractive index change distributions of the two LC lenses are the same, a refractive index change curve of light incident vertically from the bottom into any one of the two LC lenses is completely the same. Therefore, the focal lengths of the two LC lenses are the same, and the refractive index curve 20 includes edge parts 201, 202 and a central part 203. In this way, the absolute value of the refractive index of the central part 203 can be effectively reduced while the refractive index change curve of the central part 203 can be maintained. Therefore, a gap between a first substrate 11 and a second substrate 12 at two opposite sides of the LC unit is reduced to be d/2 while achieving an equivalent refraction effect.

Figure 3:
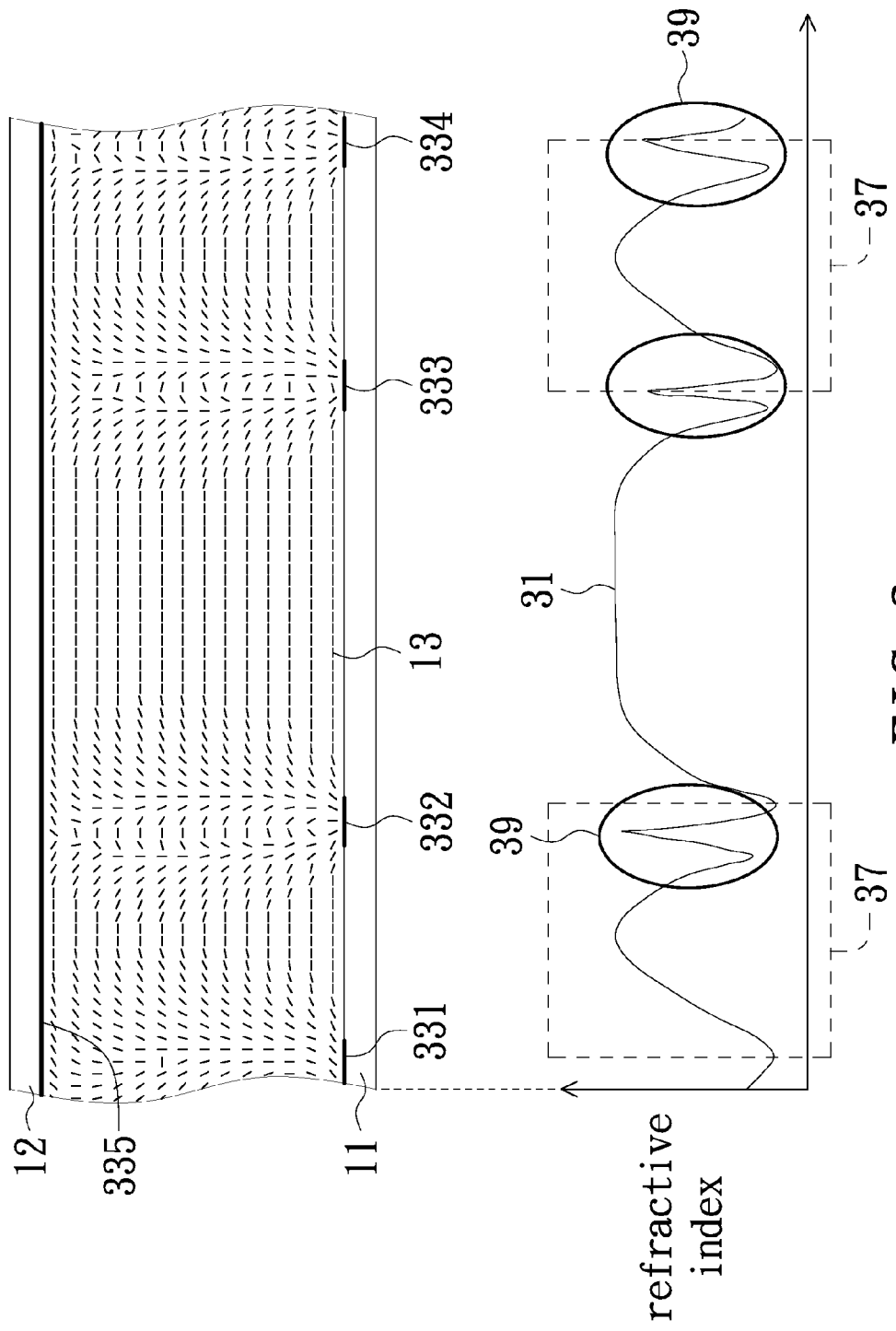
FIG. 3 is a cross-section diagram showing a lens unit of a two-level LC Fresnel lens, and a corresponding refractive index distribution curve.

An LC lens unit as shown in FIG. 3 is provided in order to simulate the specific shapes of the refractive index changes at the edge parts 201, 202 of the two-level LC Fresnel lens. In the LC lens unit shown in FIG. 3, four electrodes 331, 332, 333, 334 extending vertically to a page direction and in parallel to each other are formed on the first substrate 11, respectively. Also, a common electrode 335 is formed on the second substrate 12. Then, an electric field generated by a voltage difference is applied between the electrodes 331, 332, 333, 334 and the common electrode 335 such that LC molecules 13 between the first substrate 11 and the second substrate 12 rotate, thereby simulating a refractive index distribution as shown by a curve 31 in FIG. 3. An LC lens required in a 3D stereoscopic display can be formed by repeatedly disposing the lens unit shown in FIG. 3 side by side.

However, by this electrode configuration, the refractive index curve shown by a box 37 in FIG. 3 is an approximate symmetric distribution. Therefore, the specific shape of the left-right asymmetric distribution of the refractive index at the edge part 201 and the edge part 202 of the two-level LC Fresnel lens cannot be completely simulated. Also, the inventors found that the electrode configuration shown in FIG. 3 easily leads to disclination lines, for example, sharp parts of the refractive index curve as indicated by elliptical marks 39 in FIG. 3. The disclination lines are caused by discontinuous changes in orientations of the LC molecules 13. In order to ameliorate this deficiency, the invention further provides another electrode configuration as shown in FIGS. 4A and 4B, in which and the following drawings LC molecules are omitted and only refractive index curve are shown so as to prevent complicating the drawings.

Figure 4A:
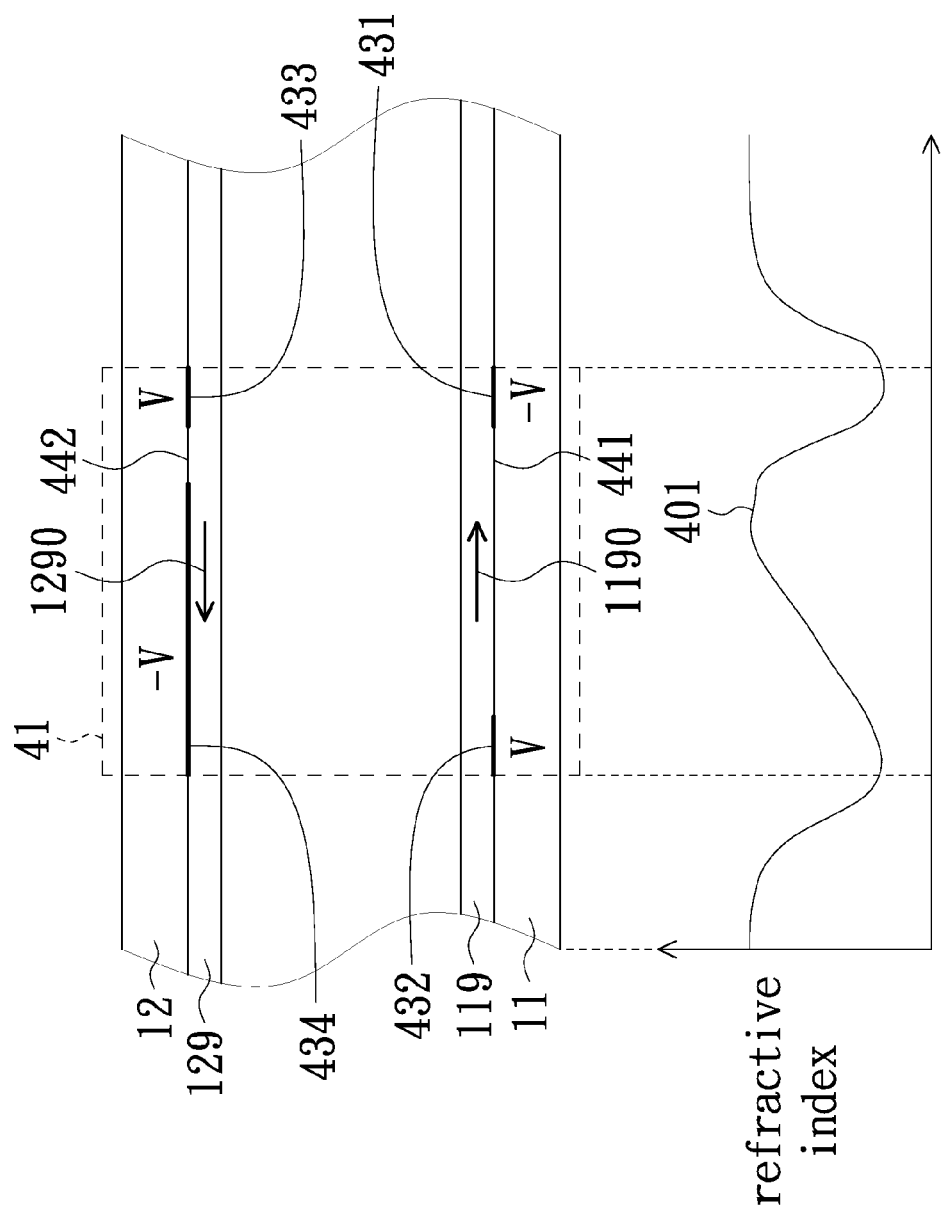
FIG. 4A is a schematic diagram showing an electrode configuration according to an embodiment of the invention for simulating the specific shape at the left edge part of the LC Fresnel lens, and a corresponding refractive index distribution curve.

FIG. 4A is a schematic diagram showing an electrode configuration for simulating the specific shape at the left edge part 201 of the two-level LC Fresnel lens, and a corresponding refractive index distribution. In this embodiment, a first electrode 431 and a second electrode 432 are formed on a first substrate 11 with a first interval 441 therebetween. The first electrode 431 and the second electrode 432 extend vertically to a page direction and in parallel to each other. Then, a third electrode 433 and a fourth electrode 434 are formed on a second substrate 12 with a second interval 442 therebetween. The third electrode 433 and the fourth electrode 434 extend vertically to a page direction and in parallel to each other. Since the width of the first interval 441 is not equal to the width of the second interval 442, the specific shape of the refractive index distribution at the left edge part 201 of the two-level LC Fresnel lens can be simulated by the first sub-unit 41. In addition, a first electric field (not shown) between the first electrode 431 and the third electrode 433 and a second electric field (not shown) between the second electrode 432 and the fourth electrode 434 are made to have different directions and include components with completely contrary directions by applying voltage differences with different polarities between the first electrode 431 and the third electrode 433, and between the second electrode 432 and the fourth electrode 434. The first electrode 431 and the third electrode 433 are overlapped. The second electrode 432 and the fourth electrode 434 are overlapped. For example, arrangements of +V and −V shown in FIG. 4A can be applied, wherein a first voltage difference (voltage of the first electrode 431 minus that of the third electrode 433 is (−V)−(+V)= −2V) is applied between the first electrode 431 and the third electrode 433, and a second voltage difference (voltage of the second electrode 432 minus that of the fourth electrode 434 is +V−(−V)=2V) is applied between the second electrode 432 and the fourth electrode 434, while the polarity of the first voltage difference is different from that of the second voltage difference (the first voltage difference is negative while the second voltage difference is positive in the present embodiment) and the first interval 441 is larger than the second interval 442. The first interval 441 and the second interval 442 are overlapped. In the present embodiment, "voltage difference" is the voltage of the electrode located on the first substrate minus that of the corresponding electrode located on the second substrate. In this way, the electric fields generated between the electrodes make the LC molecules (not shown) between the first substrate 11 and the second substrate 12 rotate, thereby obtaining a refractive index distribution curve 401 shown in FIG. 4A.

Figure 4B:
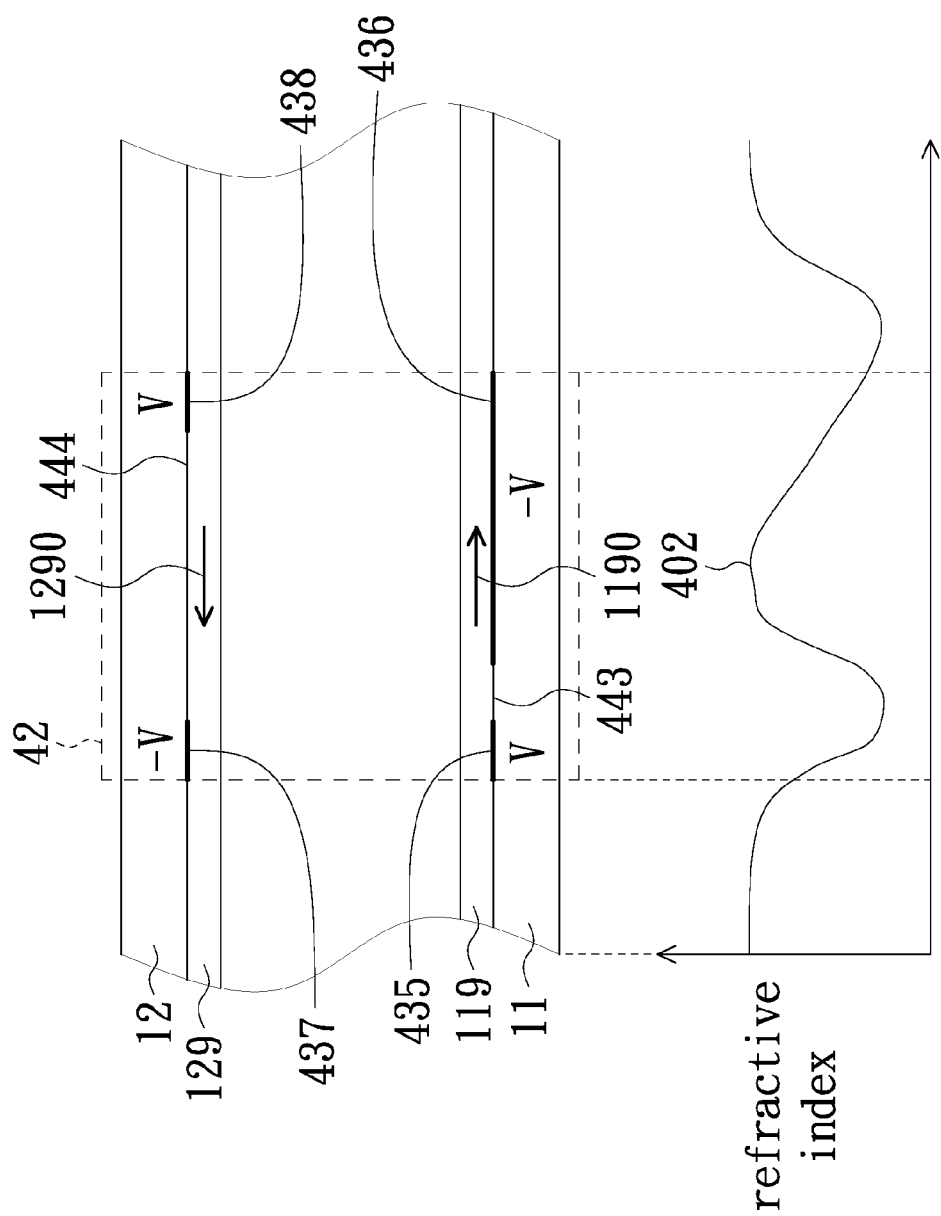
FIG. 4B is a schematic diagram showing an electrode configuration according to an embodiment of the invention for simulating the specific shape at the right edge part of the LC Fresnel lens, and a corresponding refractive index distribution curve.

FIG. 4B shows the same concept as what shown in FIG. 4A, however, FIG. 4B is a schematic diagram showing an electrode configuration for simulating the specific shape at the right edge part 202 of the two-level LC Fresnel lens, and a corresponding refractive index distribution curve. Similarly, a fifth electrode 435 and a sixth electrode 436 are formed on the first substrate 11 with a third interval 443 therebetween. The fifth electrode 435 and the sixth electrode 436 extend vertically to a page direction and in parallel to each other. Then, a seventh electrode 437 and an eighth electrode 438 are formed on the second substrate 12 with a fourth interval 444 therebetween. The seventh electrode 437 and the eighth electrode 438 extend vertically to a page direction and in parallel to each other. Since the width of the third interval 443 is not equal to the width of the fourth interval 444, the specific shape of the refractive index distribution at the right edge part 202 of the two-level LC Fresnel lens can be simulated by the second sub-unit 42. In addition, a third electric field (not shown) between the fifth electrode 435 and the seventh electrode 437 and a fourth electric field (not shown) between the sixth electrode 436 and the eighth electrode 438 are made to have different directions and include components with completely contrary directions by applying voltage differences with different polarities between the fifth electrode 435 and the seventh electrode 437, and between the sixth electrode 436 and the eighth electrode 438. The fifth electrode 435 and the seventh electrode 437 are overlapped. The sixth electrode 436 and the eighth electrode 438 are overlapped. For example, arrangements of +V and −V shown in FIG. 4B can be applied, wherein a third voltage difference (voltage of the fifth electrode 435 minus that of the seventh electrode 437 is +V−(−V)=2V) is applied between the fifth electrode 435 and the seventh electrode 437, and a fourth voltage difference (voltage of the sixth electrode 436 minus that of the eighth electrode 438 is (−V)−(+V)=−2V) is applied between the sixth electrode 436 and the eighth electrode 438, while the polarity of the third voltage difference is different from that of the fourth voltage difference (the third voltage difference is positive while the fourth voltage difference is negative in the present embodiment) and the third interval 443 is smaller than the fourth interval 444. The third interval 443 and the fourth interval 444 are overlapped. In the present embodiment, "voltage difference" is the voltage of the electrode located on the first substrate minus that of the corresponding electrode located on the second substrate. In this way, the electric fields generated between the electrodes make the LC molecules (not shown) between the first substrate 11 and the second substrate 12 rotate, thereby obtaining a refractive index distribution curve 402 shown in FIG. 4B.

In addition, a first alignment layer 119 and a second alignment layer 129 can be formed on the first substrate 11 and the second substrate 12, respectively, as shown in FIGS. 4A and 4B. A rubbing direction 1190 to the first alignment layer 119 is different from a rubbing direction 1290 to the second alignment layer 129 by 180 degrees. In this way, the tilt directions of the LC molecules that are close to the alignment layer will be the same under the electric field. Thus, the disclination line caused by discontinuous changes in orientations of the LC molecules at the boundaries of sub-units can be prevented.

Figure 4C:
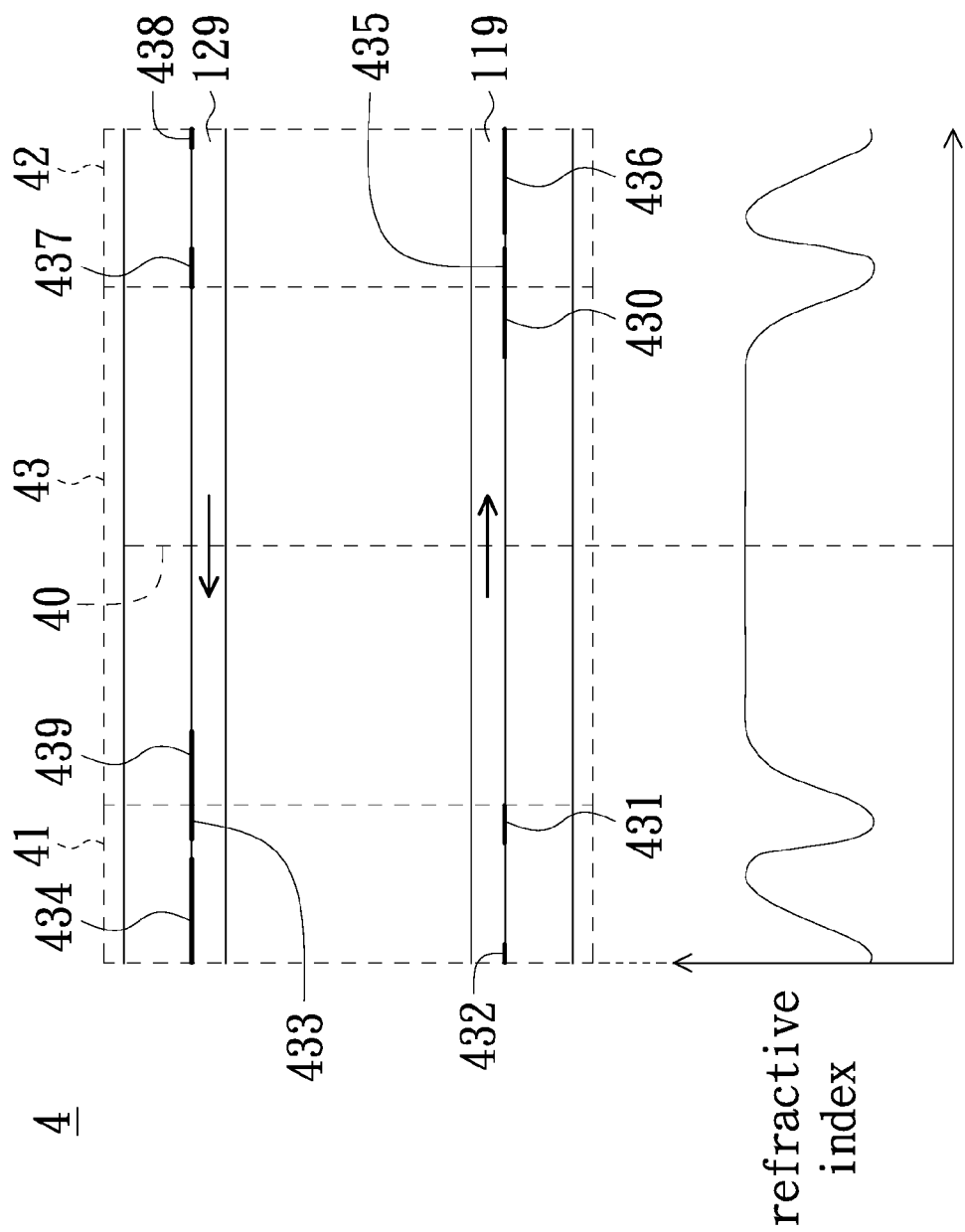
FIG. 4C is a schematic diagram showing an electrode configuration of the LC unit according to an embodiment of the invention for simulating the two-level LC Fresnel lens, and a corresponding refractive index distribution curve.

Referring to FIG. 4C, the above-mentioned sub-units are symmetrically disposed with respect to a symmetric axis to form an LC unit, wherein a first sub-unit 41 and a second sub-unit 42 are symmetric with respect to a symmetric axis 40, and a third sub-unit 43 is disposed between the first sub-unit 41 and the second sub-unit 42. The structure can simulate an LC unit 4 of a two-level LC Fresnel lens. An LC lens that can be applied to a 3D display can be formed by repeatedly disposing plural LC units 4 side by side. It is notable that, as shown in FIG. 4C, a ninth electrode 439 extending from the third electrode 433 along a width direction toward a symmetric axis direction is disposed at upper left corner of the third sub-unit 43, and a tenth electrode 430 extending from the fifth electrode 435 along a width direction toward a symmetric axis direction is disposed at lower right corner of the third sub-unit 43.

Figure 4D:
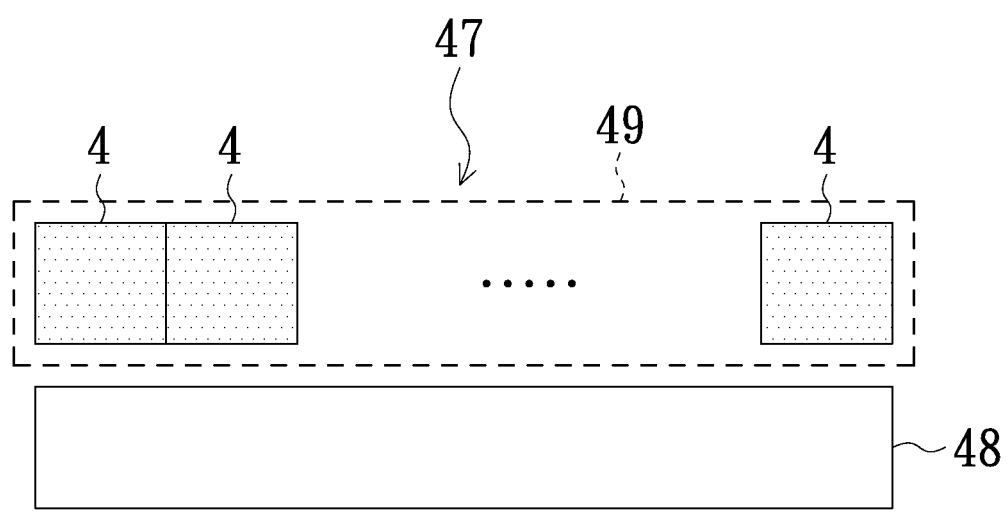
FIG. 4D is a schematic diagram showing a 3D display structure using the LC unit of the invention.

A naked eye 3D stereoscopic display can be formed by the LC units 4. As shown in FIG. 4D, an LC lens 49 is constituted by arranging the LC units 4 to be pairwise adjacent to each other. Then, the LC lens 49 is disposed above a display panel 48 to form a naked eye 3D stereoscopic display 47.

Figure 5A:
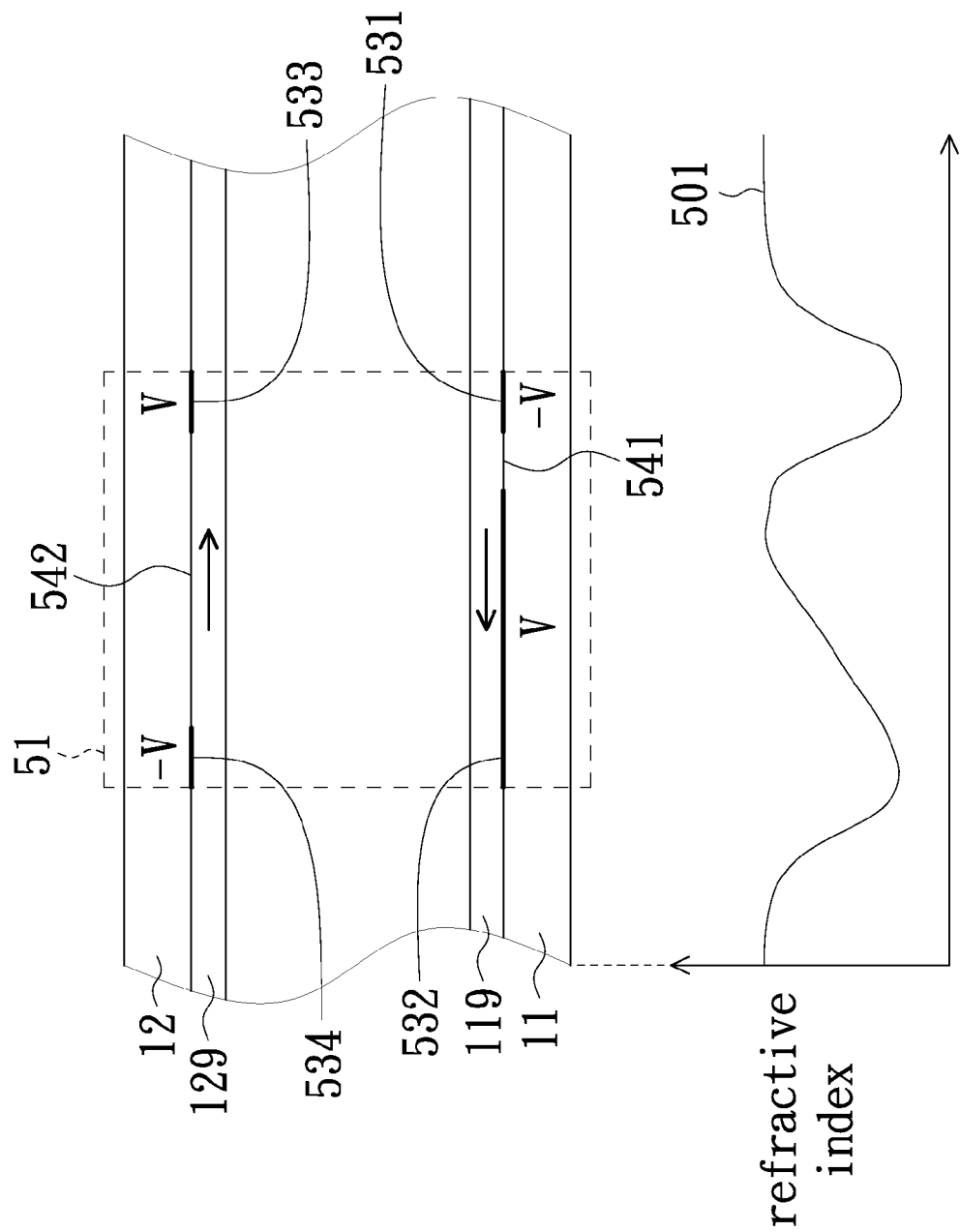
FIG. 5A is a schematic diagram showing an electrode configuration according to another embodiment of the invention for simulating the specific shape at the left edge part of the LC Fresnel lens, and a corresponding refractive index distribution curve.

FIG. 5A is a schematic diagram showing an electrode configuration according to another embodiment of the invention for simulating the specific shape at the left edge part 201 of the LC Fresnel lens, and a corresponding refractive index distribution curve. Similarly, a first electrode 531 and a second electrode 532 are formed on the first substrate 11 with a first interval 541 therebetween. The first electrode 531 and the second electrode 532 extend vertically to a page direction and in parallel to each other. Then, a third electrode 533 and a fourth electrode 534 are formed on the second substrate 12 with a second interval 542 therebetween. The third electrode 533 and the fourth electrode 534 extend vertically to a page direction and in parallel to each other. Since the width of the first interval 541 is not equal to the width of the second interval 542, the specific shape of the asymmetric refractive index distribution at the left edge part 201 of the two-level LC Fresnel lens can be simulated by the first sub-unit 51. In addition, a first electric field (not shown) between the first electrode 531 and the third electrode 533 and a second electric field (not shown) between the second electrode 532 and the fourth electrode 534 are made to have different directions and include components with completely contrary directions by applying voltage differences with different polarities between the first electrode 531 and the third electrode 533, and between the second electrode 532 and the fourth electrode 534. The first electrode 531 and the third electrode 533 are overlapped. The second electrode 532 and the fourth electrode 534 are overlapped. For example, arrangements of +V and −V shown in FIG. 5A can be applied, wherein a first voltage difference (voltage of the first electrode 531 minus that of the third electrode 533 is (−V)−(+V)=−2V) is applied between the first electrode 531 and the third electrode 533, and a second voltage difference (voltage of the second electrode 532 minus that of the fourth electrode 534 is +V−(−V)= 2V) is applied between the second electrode 532 and the fourth electrode 534, while the polarity of the first voltage difference is different from that of the second voltage difference (the first voltage difference is negative while the second voltage difference is positive in the present embodiment) and the first interval 541 is smaller than the second interval 542. The first interval 541 and the second interval 542 are overlapped. In the present embodiment, "voltage difference" is the voltage of the electrode located on the first substrate minus that of the corresponding electrode located on the second substrate. In this way, the electric fields generated between the electrodes make the LC molecules (not shown)

between the first substrate 11 and the second substrate 12 rotate, thereby obtaining a refractive index distribution curve 501 shown in FIG. 5A. The structures of this embodiment and the embodiment shown in FIG. 4A are the same for simulating the specific shape at the left edge part of the two-level LC Fresnel lens. However, rubbing directions to the first alignment layer 119 on the first substrate 11 and the second alignment layer 129 on the second substrate 12 in this embodiment are contrary to rubbing directions to the first alignment layer 119 and the second alignment layer 129 in FIG. 4A. In order to coordinate with such a combination of rubbing directions, the arrangements of the first electrode 531, the second electrode 532 and the first interval 541 on the first substrate 11, and the arrangements of the third electrode 533, the fourth electrode 534 and the second interval 542 on the second substrate 12 in this embodiment are reversed to what shown in FIG. 4A. However, the arrangements of voltages +V and −V to the electrodes are the same in this embodiment and in the embodiment of FIG. 4A.

Figure 5B:
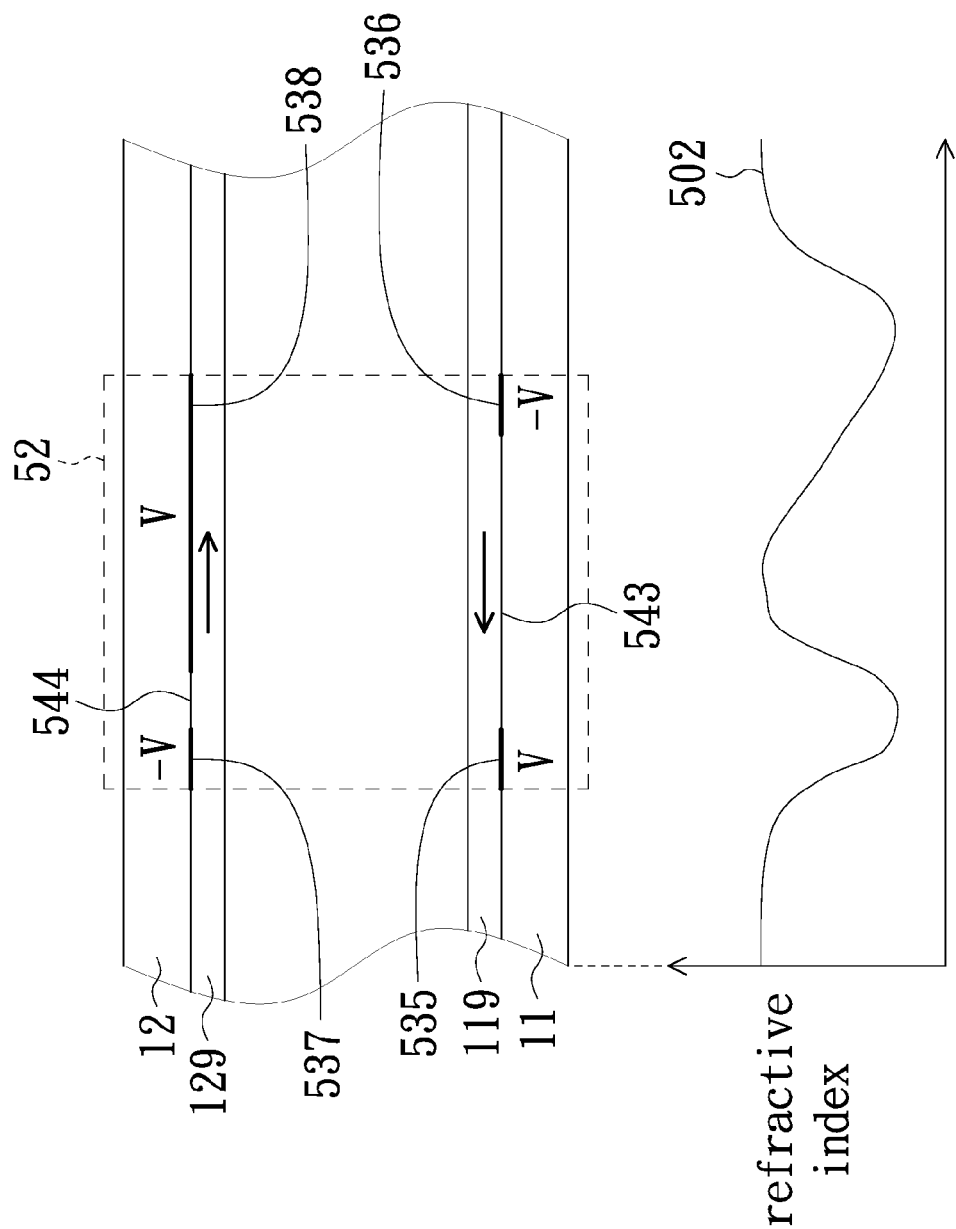
FIG. 5B is a schematic diagram showing an electrode configuration according to another embodiment of the invention for simulating the specific shape at the right edge part of the LC Fresnel lens, and a corresponding refractive index distribution curve.

FIG. 5B is a schematic diagram showing an electrode configuration for simulating the specific shape at the right edge part 202 of the two-level LC Fresnel lens, and a corresponding refractive index distribution curve, with the same concept as what shown in FIG. 4B. Referring to FIG. 5B, a second sub-unit 52 can be formed for simulating the specific shape of the asymmetric refractive index distribution at the right edge part 202 of the LC Fresnel lens. Similarly, a fifth electrode 535 and a sixth electrode 536 are formed on the first substrate 11 with a third interval 543 therebetween. The fifth electrode 535 and the sixth electrode 536 extend vertically to a page direction and in parallel to each other. Then, a seventh electrode 537 and an eighth electrode 538 are formed on the second substrate 12 with a fourth interval 544 therebetween. The seventh electrode 537 and the eighth electrode 538 extend vertically to a page direction and in parallel to each other. However, the rubbing directions to the first alignment layer 119 and the second alignment layer 129 are contrary to what shown in FIG. 4B. Therefore, the arrangements of the four electrodes and two intervals are adjusted accordingly. However, since the third interval 543 is not equal to the fourth interval 544, the specific shape of the asymmetric refractive index distribution at the right edge part 202 of the two-level LC Fresnel lens can still be simulated. In addition, a third electric field (not shown) between the fifth electrode 535 and the seventh electrode 537 and a fourth electric field (not shown) between the sixth electrode 536 and the eighth electrode 538 are made to have different directions and include components with completely contrary directions by applying voltage differences with different polarities between the fifth electrode 535 and the seventh electrode 537, and between the sixth electrode 536 and the eighth electrode 538. The fifth electrode 535 and the seventh electrode 537 are overlapped. The sixth electrode 536 and the eighth electrode 538 are overlapped. For example, arrangements of +V and −V shown in FIG. 5B can be applied, wherein a third voltage difference (voltage of the fifth electrode 535 minus that of the seventh electrode 537 is +V−(−V)=2V) is applied between the fifth electrode 535 and the seventh electrode 537, and a fourth voltage difference (voltage of the sixth electrode 536 minus that of the eighth electrode 538 is (−V)−(+V)=−2V) is applied between the sixth electrode 536 and the eighth electrode 538, while the polarity of the third voltage difference is different from that of the fourth voltage difference (the third voltage difference is positive while the fourth voltage difference is negative in the present embodiment) and the third interval 543 is larger than the fourth interval 544. The third interval 543 and the fourth interval 544 are overlapped. In the present embodiment, "voltage difference" is the voltage of the electrode located on the first substrate minus that of the corresponding electrode located on the second substrate. In this way, the electric fields generated between the electrodes make the LC molecules (not shown) between the first substrate 11 and the second substrate 12 rotate, thereby simulating a refractive index distribution curve 502 as shown in FIG. 5B.

Similarly, the first sub-unit 51 and the second sub-unit 52 can also be combined with a third sub-unit to form an LC unit similar to what shown in FIG. 4C for simulating the characteristics of a two-level LC Fresnel lens, but the details will be omitted here.

Figure 6:
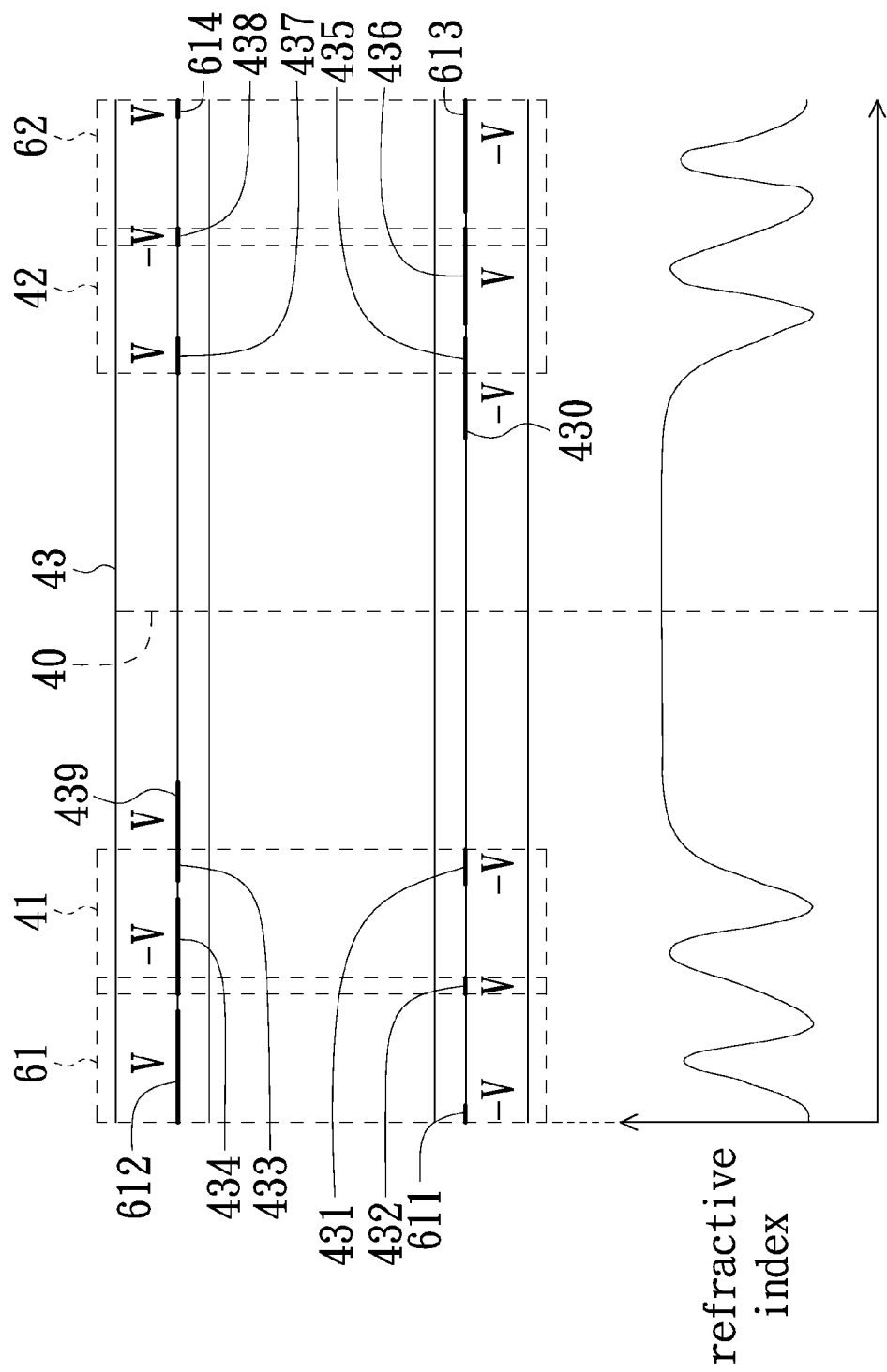
FIG. 6 is a schematic diagram showing an electrode configuration for simulating a three-level LC Fresnel lens by applying the basic concepts of the invention shown in FIGS. 4A-4C, and a corresponding refractive index distribution curve.

FIG. 6 is a schematic diagram showing an electrode configuration for simulating a three-level LC Fresnel lens by applying the basic concepts of the invention shown in FIGS. 4A-4C, and a corresponding refractive index distribution curve. The three-level LC Fresnel lens is different from the above two-level LC Fresnel lens in that a fourth sub-unit 61 with a structure similar to the first sub-unit 41 is further disposed on a side of the first sub-unit 41, and a fifth sub-unit 62 with a structure similar to the second sub-unit 42 is further disposed on a side of the second sub-unit 42, and electrodes at adjacent parts can be shared. In this way, the gap between the first substrate 11 and the second substrate 12 at two opposite sides of the LC unit can be reduced to d/3. It should be noted that since the widths are different for the LC Fresnel lenses with different levels, the electrode width should be changed accordingly. In addition, the voltage polarity arrangements to an eleventh electrode 611 and a twelfth electrode 612 in the fourth sub-unit 61 must be contrary polarities to the voltage polarity arrangements to the shared second electrode 432 and fourth electrode 434 in the adjacent first sub-unit 41. Also, the voltage polarity arrangements to a thirteenth electrode 613 and a fourteenth electrode 614 in the fifth sub-unit 62 must be contrary polarities to the voltage polarity arrangements to the shared sixth electrode 436 and eighth electrode 438 in the adjacent second sub-unit 42. Further, in this embodiment, since the eleventh electrode 611 and the fourteenth electrode 614 are small in size, the three-level LC Fresnel lens can be also be formed even omitting the eleventh electrode 611 and the fourteenth electrode 614 in an allowable range of the performance loss. A three-level LC Fresnel lens according to another embodiment of the invention can also be simulated by applying the first sub-unit 51 and the second sub-unit 52 shown in FIGS. 5A and 5B, wherein two shorter electrodes among the outermost electrodes can be omitted.

Figure 7:
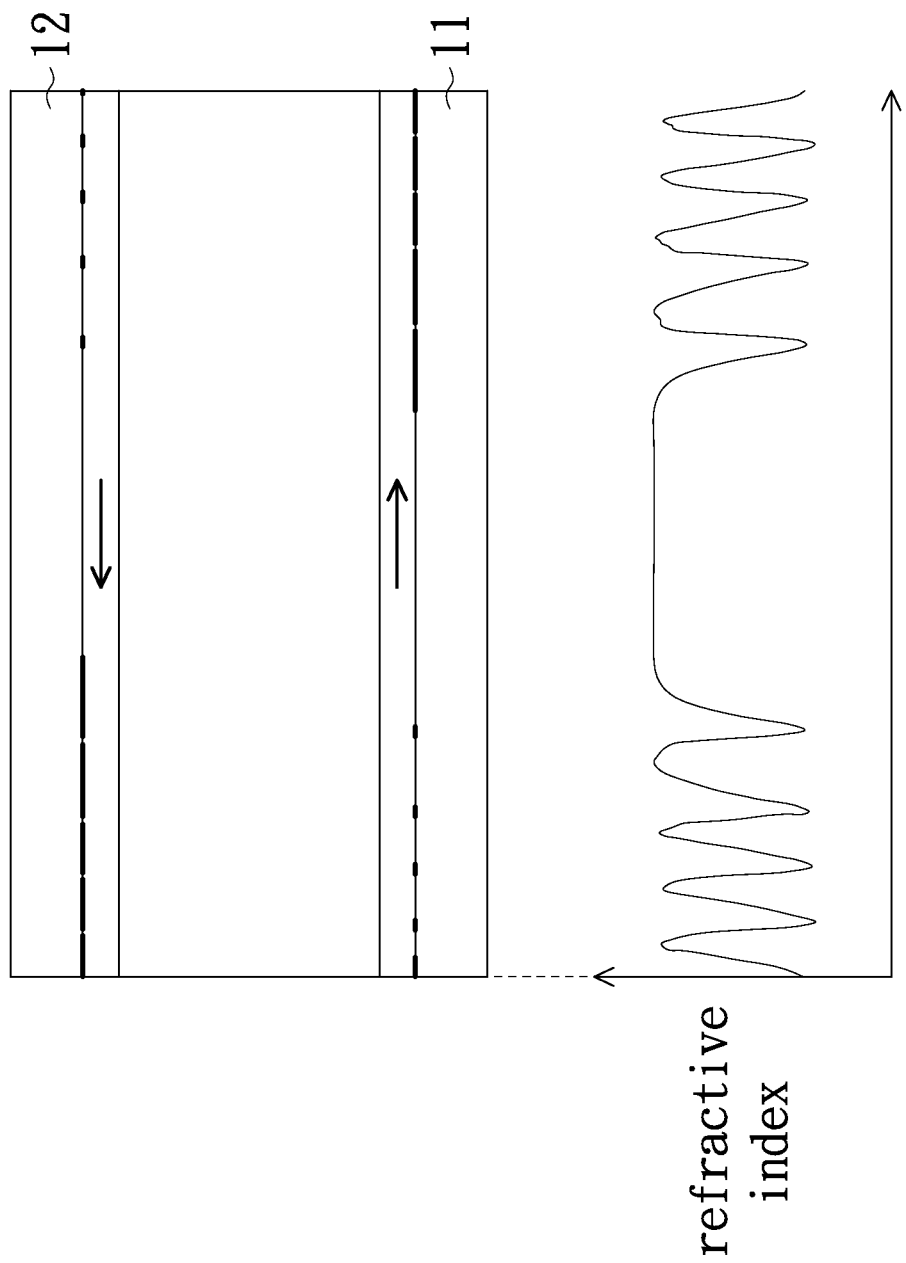
FIG. 7 is a schematic diagram showing an electrode configuration for simulating a five-level LC Fresnel lens by applying the basic concepts of the invention, and a corresponding refractive index distribution curve.

FIG. 7 is a schematic diagram showing an electrode configuration for simulating a five-level LC Fresnel lens by applying the basic concepts of the invention, and a corresponding refractive index distribution curve. The concept of the five-level LC Fresnel lens is the same as that of the above three-level LC Fresnel lens, and therefore the details will not be repeated here. The gap between the first substrate 11 and the second substrate 12 at two opposite sides of the LC unit in the five-level LC Fresnel lens can be further reduced to d/5. Of course, the level of the LC Fresnel lens can be reduced to four-level or increased to be larger than five-level according to the basic concept of the invention. That is, the level of the LC Fresnel lens can be determined according to the practical application, and therefore it is not limited to the above embodiments.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal lens, comprising:
a first substrate;
a second substrate; and
a plurality of liquid crystal units disposed between the first substrate and the second substrate,
wherein each liquid crystal unit comprises a first sub-unit, and the first sub-unit comprises:
a first electrode and a second electrode disposed on the first substrate with a first interval therebetween; and
a third electrode and a fourth electrode disposed on the second substrate with a second interval therebetween,
wherein a first voltage difference is a voltage of the first electrode minus that of the third electrode, a second voltage difference is a voltage of the second electrode minus that of the fourth electrode, a polarity of the first voltage difference is contrary to that of the second voltage difference and the first interval is not equal to the second interval.

2. The liquid crystal lens as claimed in claim 1, wherein the first substrate has a first alignment layer, the second substrate has a second alignment layer, and a rubbing direction to the first alignment layer is contrary to a rubbing direction to the second alignment layer.

3. The liquid crystal lens as claimed in claim 1, wherein the liquid crystal units are pairwise adjacent to each other.

4. The liquid crystal lens as claimed in claim 1, wherein a width of the first electrode is equal to that of the third electrode, a width of the second electrode is smaller than that of the fourth electrode, and the first interval is larger than the second interval.

5. The liquid crystal lens as claimed in claim 1, wherein a width of the first electrode is equal to that of the third electrode, a width of the second electrode is larger than that of the fourth electrode, and the first interval is smaller than the second interval.

6. The liquid crystal lens as claimed in claim 1, wherein each liquid crystal unit further comprises a second sub-unit, the second sub-unit and the first sub-unit are symmetrically disposed in the liquid crystal unit with respect to a symmetric axis, and the second sub-unit comprises:
a fifth electrode and a sixth electrode disposed on the first substrate with a third interval therebetween; and
a seventh electrode and an eighth electrode disposed on the second substrate with a fourth interval therebetween,
wherein a third voltage difference is a voltage of the fifth electrode minus that of the seventh electrode, a fourth voltage difference is a voltage of the sixth electrode minus that of the eighth electrode, a polarity of the third voltage difference is contrary to that of the fourth voltage difference and the third interval is not equal to the fourth interval.

7. The liquid crystal lens as claimed in claim 6, wherein a width of the fifth electrode is equal to that of the seventh electrode, a width of the sixth electrode is larger than that of the eighth electrode, and the third interval is smaller than the fourth interval.

8. The liquid crystal lens as claimed in claim 6, wherein a width of the fifth electrode is equal to that of the seventh electrode, a width of the sixth electrode is smaller than that of the eighth electrode, and the third interval is larger than the fourth interval.

9. The liquid crystal lens as claimed in claim 6, wherein each liquid crystal unit further comprises a third sub-unit disposed between the first sub-unit and the second sub-unit, and the third sub-unit comprises:
a ninth electrode disposed on the second substrate and in connect with the third electrode, and the ninth electrode extending toward a symmetric axis direction; and
a tenth electrode disposed on the first substrate and in connect with the fifth electrode, and the tenth electrode extending toward the symmetric axis direction.

10. A 3D display, comprising:
a display panel; and
a liquid crystal lens disposed above the display panel, the liquid crystal lens comprising:
a first substrate;
a second substrate; and
a plurality of liquid crystal unit disposed between the first substrate and the second substrate, wherein each liquid crystal unit comprises a first sub-unit, the first sub-unit comprising:
a first electrode and a second electrode disposed on the first substrate with a first interval therebetween; and
a third electrode and a fourth electrode disposed on the second substrate with a second interval therebetween,
wherein a first voltage difference is a voltage of the first electrode minus that of the third electrode, a second voltage difference is a voltage of the second electrode minus that of the fourth electrode, a polarity of the first voltage difference is contrary to that of the second voltage difference and the first interval is not equal to the second interval.

11. The 3D display as claimed in claim 10, wherein the first substrate has a first alignment layer, the second substrate has a second alignment layer, and a rubbing direction to the first alignment layer is contrary to a rubbing direction to the second alignment layer.

12. The 3D display as claimed in claim 10, wherein the liquid crystal units are pairwise adjacent to each other.

13. The 3D display as claimed in claim 10, wherein a width of the first electrode is equal to that of the third electrode, a width of the second electrode is smaller than that of the fourth electrode, and the first interval is larger than the second interval.

14. The 3D display as claimed in claim 10, wherein a width of the first electrode is equal to that of the third electrode, a width of the second electrode is larger than that of the fourth electrode, and the first interval is smaller than the second interval.

15. The 3D display as claimed in claim 10, wherein each liquid crystal unit further comprises a second sub-unit, the second sub-unit and the first sub-unit are symmetrically disposed in the liquid crystal unit with respect to a symmetric axis, the second sub-unit comprises:
a fifth electrode and a sixth electrode disposed on the first substrate with a third interval therebetween; and
a seventh electrode and an eighth electrode disposed on the second substrate with a fourth interval therebetween,
wherein a third voltage difference is a voltage of the fifth electrode minus that of the seventh electrode, a fourth voltage difference is a voltage of the sixth electrode minus that of the eighth electrode, a polarity of the third voltage difference is contrary to that of the fourth voltage difference and the third interval is not equal to the fourth interval.

16. The 3D display as claimed in claim 10, wherein a width of the fifth electrode is equal to that of the seventh electrode, a width of the sixth electrode is larger than that of the eighth electrode, and the third interval is smaller than the fourth interval.

17. The 3D display as claimed in claim 10, wherein a width of the fifth electrode is equal to that of the seventh electrode, a width of the sixth electrode is smaller than that of the eighth electrode, and the third interval is larger than the fourth interval.

18. The 3D display as claimed in claim 10, wherein each liquid crystal unit further comprises a third sub-unit disposed between the first sub-unit and the second sub-unit, the third sub-unit comprises:
- a ninth electrode disposed on the second substrate and in connect with the third electrode, and the ninth electrode extending toward a symmetric axis direction; and
- a tenth electrode disposed on the first substrate and in connect with the fifth electrode, and the tenth electrode extending toward the symmetric axis direction.

* * * * *